Patented Feb. 19, 1952

2,586,188

UNITED STATES PATENT OFFICE 2,586,188

METHOD OF PIGMENT COLORING

Alfred E. Van Wirt and George F. Jones, Glens Falls, N. Y., assignors to Imperial Paper and Color Corporation, Glens Falls, N. Y., a corporation of New York No Drawing. Application June 24, 1947,
Serial No. 756,800

5 Claims. (Cl. 117—47)

This invention relates to pigment coloring, and has for its object the provision of an improved method of producing a pigmented colored surface on various articles, such, for example, as textile fabrics, yarn, paper and especially wallpaper, leather, roofing granules and other articles, etc.

The heretofore customary methods of applying decorative colored effects to the surface of textile fabrics usually involve the use of dyes. Various proposals have, however, been made for the substitution of pigment colors for dyestuffs in applying colored surfaces to fabrics. Pigment colors have, in general, several advantages over dyestuffs, such as visibility during printing, good light resistance and opacity, and lower cost. One of the chief advantages of pigments over dyestuffs is the complete absence of chemical instability that is frequently encountered with dyestuffs. Elimination of chemical reactions in dyeing and printing plants is the main reason for use of pigments. On the other hand, pigment films have been found inferior to dyes in resistance to alternate laundering and exposure to light and to smudging. These inferiorities or weaknesses of pigment colors are probably due to the difference in the mechanical nature of coloring by dyes and pigments. Thus, dyes are used in solution and are adsorbed on the fabric and absorbed to some extent into the fibers thereof, whereas pigments are used in suspension and are applied as a bonded coating or film on the fabric with some pigment on the outside surface of the coating or film. Hence, only a slight loss in this bonded pigment coating, due to abrasion, washing or exposure to light, results in a noticeable loss in color.

The use of dyestuffs in textile printing processes is attended by certain inherent difficulties. Thus, the application of the printed design by a "developed" dye is difficult since the printer is unable to judge the quality of his print until after development or coupling of the dye intermediates employed in the printing process. Furthermore, printing by either a direct or "developed" dye frequently yields products in which the colored areas are deficient in lightfastness and resistance to perspiration, crocking, dry cleaning solvents, and washing. The proposals to replace dyes by pigments in such printing processes generally involve the dispersion of an insoluble pigment and a binder in a suitable vehicle, usually with an included thickening agent to form a printing paste. In printing the fabric with such a pigment dispersion, the binder is adsorbed to a greater or less degree in and on the interstices formed by the interlaced fibers, so that upon evaporation of the volatile constituent, a pigmented film is produced. The binders used in these pigment printing processes may be generally divided into three classes, viz. (1) water soluble, (2) organic solvent soluble, and (3) emulsions of either the water-in-oil or oil-in-water type. With water soluble binders, such as starch, glue, albumen or casein, it is difficult to obtain prints possessing high wash resistance, good resistance to crocking, good resistance to color change in cyclic exposure to light followed by washing after each period of exposure, and a good "hand." With organic solvent soluble binders (such as synthetic resins) as well as with emulsions (such as resin emulsions of the water-in-oil type), provision must be made for prevention of the occurrence of explosive concentrations of solvent in the printing area, and an organic solvent is required in cleaning machinery used in printing, thus presenting manufacturing hazards. The disposal of waste also presents a distinct problem where pollution of streams must be avoided. Moreover, even with synthetic resin binders, it is extremely difficult to obtain prints having high lightfastness, high resistance to crocking and high resistance to color change in cyclic exposure to light-and-wash tests.

In the course of an extensive investigation of pigment coloring, we have found that certain pigment colors dispersed in water are incompatible with aqueous dispersions of certain water-soluble or water-dispersible resins, and flocculation or precipitation of the pigment and resin occurs when the two water dispersions are brought together under suitable conditions. The pigment dispersion is first printed on a fabric, and then the printed fabric is exposed to the resin dispersion, resulting in precipitation of the resin on and around the pigment. We have, accordingly, been able to produce prints which are far better in smudge resistance and to alternate laundering and light exposure than any other pigment prints which we have examined. The resin is precipitated only where the pigment dispersion is applied, and very little resin is absorbed permanently by the unprinted fabric.

Our present invention thus comprises applying a pigment in aqueous suspension to the surface of the article to be colored, and subsequently treating the resulting pigmented surface with an aqueous dispersion of a water-dispersible resin carrying electrical charges, preferably positive charges, in the presence of an agent capable of flocculating the resin, and thereby depositing the resin on the pigmented surface. The aqueous material other than the resin may be neutral or contain a charge opposite to the charge of the resin but cannot contain the same charge or no precipitation will occur in the printing or dyeing operation. According to one aspect of the invention, there is first applied to the article, by any suitable means, a water suspension or dispersion of a pigment containing a flocculent having electrical charges on the resin particles, then applying an aqueous dispersion of a water-dispersible resin having electrical charges opposite to those of the flocculent, resulting in the formation of a film or coating of the resin on and over the pigmented surface. The character of the resin deposit or coating is generally improved by appropriate after-treatment to set or insolubilize the resin, such, for example, as heat treatment or treatment with a chemical or catalytic agent to set or cure the resin. The pigment is water-insoluble and may be either an inorganic or an organic pigment. Typical examples of such pigments are chrome yellows, chrome oranges, molybdate oranges etc. and phthalo cyanine blue, phthalocyanine green, hansa yellow, alizarine etc. The aqueous suspension may contain, in addition to the pigment, a suitable pigment-dispersing agent, or a thickening agent (particularly where the suspension is to be applied in the form of a paste as in textile printing), or both, and either or both agents may be resin coagulants. The water-dispersible resin is preferably and usually a synthetic resin soluble or dispersible in water, and aqueous "dispersion" is herein intended to include a solution or an emulsion of the resin. The resin flocculating agent is any substance capable of flocculating, agglomerating, coagulating or precipitating the resin from its aqueous dispersion. The flocculent is a material which, when dissolved or dispersed in water, carries a charge, preferably negative, and tends to migrate to the positive pole of a pair of electrodes and is then precipitated. The invention is hereinafter more particularly described in its application to the printing of colored designs on cloth and other fabrics.

In carrying out the invention in accordance with one embodiment thereof, a suspension of the pigment in an aqueous medium is prepared. The pigment suspension contains a pigment-dispersing agent, which also acts as a flocculent for the resin in the subsequently applied resin dispersion, and a thickening agent, which may also act as a flocculent. The aqueous suspension of pigment, dispersing agent and thickening agent may be prepared in any appropriate and convenient manner. It is advantageous that the coloring mixture contain a material having a negative charge in view of the advantages in using a resin having positive charges. The dispersing agent contributes to the deaggregation of the pigment, producing and maintaining a high degree of deflocculation of the pigment, while the thickening agent produces a paste of sufficient body for satisfactory application by the chosen process. The pigmented suspension is applied to the surface of the article to be colored, and the article is then brought into contact with a dilute aqueous dispersion (or solution or emulsion) of a suitable resin. The areas of the article not covered by the application of the pigmented suspension (which contains the resin coagulant) do not accept an appreciable quantity of resin. On the other hand, the areas to which the pigmented suspension was applied and in which the flocculent of the resin is present accept resin readily to a degree dependent on the amount of flocculent present, upon the concentration and temperature of the resin dispersion, and the time of contact of the pigmented areas with the resin dispersion, and a film or coating of resin is thus deposited on the pigmented areas. The article need not be dried following the application of the pigmented suspension, although drying is desirable in some cases, but on the contrary may be directly and immediately treated with the resin dispersion. The article is next usually subjected to heat or other appropriate treatment to improve the integrity of the film by curing the resin. A pigmented coating is thus produced which has excellent lightfastness, crock-resistance, resistance to cyclic light exposure and wash tests, and of good "hand."

When the aqueous resin dispersion comes in contact with pigmented areas containing flocculating agent, the resin solids are agglomerated, flocculated or precipitated from the aqueous dispersion. A film of resin binder is thus formed on and over the pigmented areas, but this film does not usually have good mechanical properties, and in the case of fabrics its crock-resistance is low, washability is poor, and unsatisfactory resistance to cyclic wash-light exposure tests is obtained. We now believe that this poor behavior of the initial resin film is due to the probability that the precipitants for the resin do not produce polymerization of the resin to a very large extent, and it may also be possible that the initial resin film is not continuous. After heat treatment of the resin film (e. g. at around 300° F. in the case of urea-formaldehyde resins), polymerization presumably rapidly occurs, and a continuous resin film of excellent physical properties is formed. In lieu of heat treatment, the initial resin film may be cured or set as hereinbefore mentioned. Some resins may cure or set at normal drying temperatures of the order of 180–300° F., and still other resins may require no final heat or other treatment.

The invention may advantageously be applied as a pigment "dyeing" process. In this modification of the invention, the article or material to be colored is immersed in an aqueous suspension of the pigment, removed from the pigment-suspension, immersed in an aqueous suspension of the pigment and an agent or chemical which is a flocculent for the resin to be subsequently applied, and then immersed in or otherwise brought into contact with an aqueous resin dispersion. The resin film may then be heat-treated or may be treated with chemical curing agents.

In certain cases, the "hand" of the printed or pigment-"dyed" fabric may be improved by subjecting the cured resin film either to mechanical crimping or by treating the pigment-colored film or article with an emulsion or solution of a textile softening agent. The cation active softeners or sulfonated ricinoleic acid may be used for this purpose.

A wide variety of synthetic resins and flocculents are available for practicing the invention. The resin should be water-soluble or water-dispersible, and for the purposes of the invention an aqueous solution or emulsion of the resin is the equivalent of an aqueous dispersion of the resin. The resin may be considered as a colloid bearing a positive charge stabilized by the adsorption of the charge and may be flocculated by another colloid carrying an opposite charge.

Water-dispersible resins of the urea-formaldehyde type which are particularly suitable for the purposes of the invention, polymerized to as high a molecular weight as permits the production of water soluble or dispersible products, give excellent results. Preferably, we use a urea-formaldehyde resin modified by cooking with triethanol amine in the presence of an alcohol, such as isopropyl alcohol. Curing or final setting of these resins is effected by heating at a moderate temperature (e. g. of the order of 300° F.), and when completely cured the resin is insoluble in water and organic solvents.

A suitable resin may be prepared from the following compounds:

|  | Weight | Mols |
|---|---|---|
|  | Grams |  |
| Triethanolamine | 100 | ½ |
| Formaldehyde | 80 | 2 |
| Urea | 75 | 1 |
| Isopropyl Alcohol | 40 | ½ |

Dissolve the urea in the triethanolamine and isopropyl alcohol by warming on reflux. Add the formaldehyde and warm until clear. Heat, but do not boil, the mixture for 8 minutes. The isopropyl alcohol refluxes somewhat during this time. Add 100 cc. of 1:1 hydrochloric acid, through the condenser, add slowly to prevent overheating. Dilute with 100 cc. water. Remove from reflux and finish acidifying. pH should be 1.5 to 2.0 after 8 cc. more of 1:1 acid is added. Buffer with 1.5 to 2.0 gms. anhydrous sodium carbonate: this brings the pH up to 6.0.

The proportions of the triethanolamine, formaldehyde and urea may be varied within narrow limits and the alcohol over a wide range.

In describing the urea-formaldehydes, we have used the term "urea" for simplification. Actually the urea constituent may be replaced with other carbamides, and in a broad sense, our invention pertains to carbamide-formaldehyde resins. In place of urea we may use thiourea, melamine, guanidine, and di-cyandiamine.

Among other suitable resins for the purposes of the invention are the water-dispersible resins of phenol-formaldehyde types, although these resins, so far as we have yet determined, do not give as satisfactory overall results as the urea-formaldehyde resins.

The flocculent will be determined by the resin itself, and a variety of flocculents are available for any particular resin. Preferably, a flocculent is chosen which is also a dispersing agent for the pigment in an aqueous suspension or paste. Formaldehyde condensation products of certain naphthalene sulfonic acids are effective pigment dispersing agents and flocculents, particularly for resins of the urea-formaldehyde type. The sodium salt of a sulfonated lignin compound is an extremely effective flocculent. Sodium alginate, among other compounds, functions as a thickening agent for aqueous printing pastes and also acts as a flocculent. Among a wide variety of other flocculents may be mentioned gelatin, starch, soya protein, other proteins (particularly those possessing characteristics similar to soya protein), aluminum sulfate, sodium carboxymethylcellulose, acids, etc. We prefer to avoid the use of strong electrolytes as flocculents in printing pastes, since their presence in the paste tends, in certain cases, to flocculate the pigment in the suspension, with the result that weak, "washy" prints are obtained. In pigment-"dyeing" processes, in which the flocculent is applied, preferably with the pigment, after the article or material to be pigmented has been immersed in or otherwise brought in contact with the aqueous pigment suspension, these last-mentioned flocculents may be satisfactorily used.

As stated above, it is advantageous to include in the system a negatively charged material in sufficient quantity to react with the positively charged resin. This negatively charged material may be the dispersing agent used with the pigment, such as sulfonated lignin, the thickening agent, such as sodium alginate, or a binder, such as a negatively charged emulsion of synthetic resin. It may be other materials, such as soluble salts of poly-valent anions, for example sodium sulfate and sodium phosphate.

The aqueous pigment suspension, the flocculent and the aqueous resin dispersion may be applied to the article to be colored in various ways as, for example, by spraying, by rollers, by immersion etc. For example, after application of the pigment suspension by any conventional textile printing process, and after application of the flocculent (which may advantageously be included in the pigment suspension), the resin may be applied by immersing the article in a dilute aqueous solution of the resin (e. g. 3 to 5% resin solids), or the dilute aqueous resin solution may be applied by spraying, or by rollers or the like. The surface areas of the article which contain no flocculent accept the resin to a limited extent only. In the presence of flocculent, the amount of resin accepted by the article depends upon the amount of flocculent present, the concentration of the resin solution, the time of contact of the resin solution with the flocculent area, and the treatment temperature.

After application of the resin, any excess resin mechanically held by the article, e. g. fabric, may be removed by squeezing, suction, draining, centrifuging, washing or other appropriate means. The article may then be dried, treated with other materials (e. g. softening agents), subjected to heat or other appropriate treatment to set or insolubilize the resin, or given any further treatment customarily applied to the particular article or material.

In practicing the invention for producing colored effects on fabrics and the like, it is necessary that sufficient resin be applied to properly coat all of the pigment and bind it to the fabric, in order to obtain satisfactory crock-resistance, light-fastness and resistance to color change in cyclic light exposure and wash tests. In general, this result is achieved with a weight ratio of the order of 5 to 10 parts of resin solid to one part of pigment. However, this weight ratio of resin to pigment is merely illustrative, since the ratio will vary with the nature of the pigment, the resin and the intended use of the finished article. The temperature of treatment is important, since a greater amount of resin is accepted in the flocculent areas as the treatment temperature is increased. For example, at a treatment temperature of 25° C., at least 3 to 4 minutes immersion in a 3% aqueous resin solution is required to apply or introduce 7 parts of resin to 1 part of pigment, and longer times of immersion produce no appreciable additional resin absorption. At a treatment temperature of 50° C., 7 parts of resin to 1 part of pigment are absorbed or taken up in 15 seconds immersion, and longer immersion increases the weight ratio of resin absorbed to pigment to the order of 15 to 1.

With weight ratios of from 7 to 10 parts of resin solids to 1 part of pigment, and a pigment of excellent light-fastness, the invention produces colored effects in which no color change occurs after 6 cycles of exposure to light for 20 hours, in a unit known commercially as a twin arc Fadeometer, followed by a laundry test after each exposure period. Other methods of textile printing with pigment colors heretofore known in the art yield prints which show color failure after 3 such cycles. Lower ratios of resin to pigment give unsatisfactory crock-resistance and poorer performance in the cyclic light exposure and wash tests.

In a specific practice of the invention, a 4% by weight aqueous solution of sodium alignate was prepared. An equal volume of a 2% aqueous suspension of a phthalocyanine blue pigment was prepared. The aqueous pigment suspension was added slowly, with vigorous agitation, to the alginate solution, and the resulting mass thoroughly mixed. A thickened pigment suspension (paste) suitable for printing was thus produced. The paste was applied in conventional manner to produce a printed design on a textile fabric. After drying the printed design, the fabric was immersed in a 3% by weight resin solids dispersion of cationic urea-formaldehyde resin. An immersion for 30 seconds was sufficient to insure a suitable resin deposit on the printed areas of the fabric. At temperatures lower than 50° C., equally good results are obtained with longer immersion times. For example, at 25° C., a 3 minute immersion time is satisfactory. Upon removing the fabric from the bath of resin dispersion, excess resin was removed from the non-printed areas, either by pressure or vacuum, and the fabric was then subjected to a water bath, or spray if desired, to remove substantially all excess resin from the non-printed areas. After washing, the fabric was dried and heat-treated at a temperature of 300° F. for 5 minutes to properly cure and harden the resin deposit. The fabric was then thoroughly washed in warm soap solution, rinsed and dried. The "hand" of the fabric was then improved by treatment with a softening agent. The "hand" may be improved by mechanical treatment. We have found that drying after the application of the pigment and flocculent (dyeing process), or after the application of the paste (printing process) before immersion in the resin bath generally produces a greater uniformity of print or dyeing, and does much to eliminate "two-sided" effects in dyeing.

We claim:

1. The method of producing a colored surface on an article which comprises applying to the article a pigment dispersed in an aqueous suspension of a protein capable of flocculating the cationic resin thereafter applied, and subsequently applying to the pigmented surface an aqueous dispersion of a water dispersible resin of the carbamide formaldehyde type which has been made strongly cationic by having been temporarily subjected to a low pH of at least 1.5 and buffered to a pH of around 6 in the presence of triethanolamine and thereby precipitating the resin on the pigmented surface, and heat-treating the resin applied to the article to cure the resin.

2. The method of producing a colored surface on an article which comprises applying to the article a thickened aqueous pigment paste which is negatively charged, and subsequently applying to the pigment paste on the article an aqueous dispersion of a water-dispersible resin of the group consisting of melamine-formaldehyde and urea-formaldehyde, said resin being cationic, the cationic resin having been produced by temporarily subjecting the resin in the presence of triethanolamine to a pH of at least 1.5 with acid and then buffering the charged resin to a pH of about 6, and heat-treating the resin applied to the article to cure the resin.

3. In the method of claim 2, using in the pigment paste sodium alignate as thickening agent.

4. In the method of claim 2, using in the pigment paste starch as thickening agent.

5. In the method of claim 2, using in the pigment paste sodium carboxymethylcellulose as thickening agent.

ALFRED E. VAN WIRT.
GEORGE F. JONES.

REFERENCES CITED

The following references are of record in the file of this patent:

UNITED STATES PATENTS

| Number | Name | Date |
|---|---|---|
| 2,101,251 | Gotte et al. | Dec. 7, 1937 |
| 2,121,205 | Lippert et al. | June 21, 1938 |
| 2,169,546 | Widmer et al. | Aug. 15, 1939 |
| 2,185,746 | Goencz et al. | Jan. 2, 1940 |
| 2,255,901 | Schroy | Sept. 16, 1941 |
| 2,345,543 | Wohnsiedler et al. | Mar. 28, 1944 |
| 2,385,320 | Greene et al. | Sept. 18, 1945 |
| 2,416,884 | Schreiber et al. | Mar. 4, 1947 |
| 2,421,363 | Young | May 27, 1947 |
| 2,431,562 | Jacoby | Nov. 25, 1947 |
| 2,460,998 | Nelson | Feb. 8, 1949 |

FOREIGN PATENTS

| Number | Country | Date |
|---|---|---|
| 575,379 | Great Britain | Feb. 15, 1946 |